July 7, 1936.  N. MILLER  2,046,646
EXPOSURE METER
Filed May 16, 1932  2 Sheets-Sheet 1

Inventor
Nicholas Miller

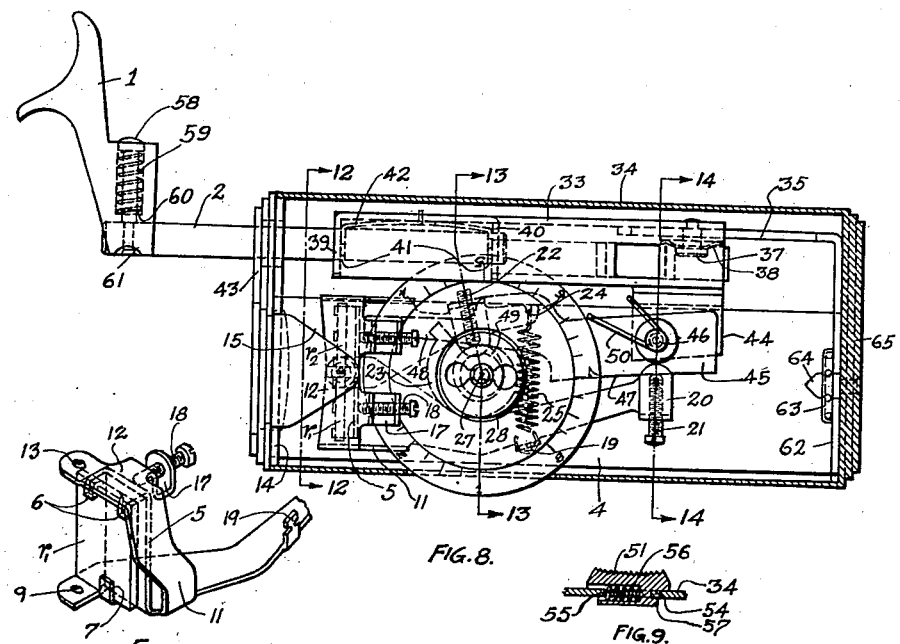
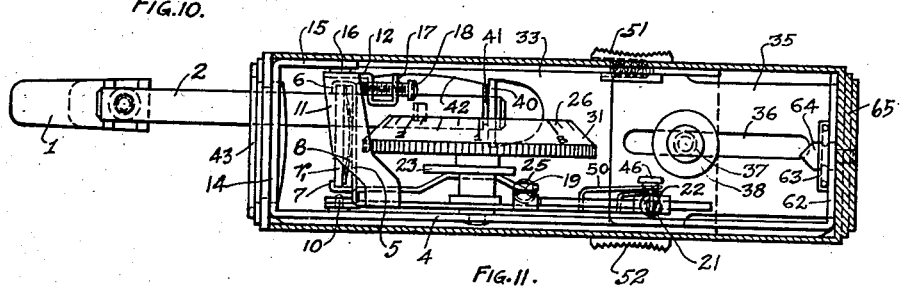
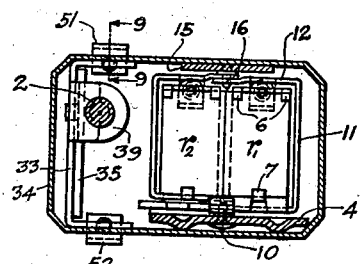
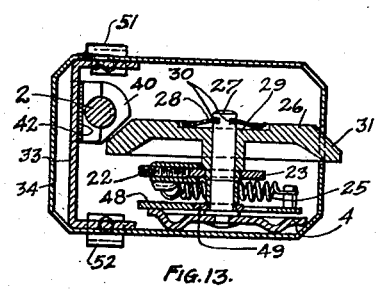
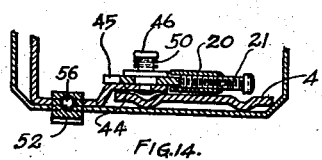

Patented July 7, 1936

2,046,646

UNITED STATES PATENT OFFICE 2,046,646

EXPOSURE METER

Nicholas Miller, Westchester, Ill.

Application May 16, 1932, Serial No. 611,565

10 Claims. (Cl. 88—23)

The pupillary opening of the eye, as is well known, varies with the intensity of the light entering the eye and is caused by the automatic contraction or dilation of the iris, which tends to maintain a constant light energy on the retina. The diameter of the pupil varies from 2 to 8 millimeters, and the objects of the present invention are to provide a device for the estimation of light intensities by the measurements of the pupillary diameters, which may be expressed in terms of exposure times required in photography.

In the present invention a magnified virtual image of the pupil, formed by a convex lens in front of it, is viewed by means of a pair of adjacent reflectors, which are pivotally mounted so that the angle between them may be varied at will. When the angle between the reflectors is other than zero, each reflector will reflect a distinct image from the virtual image rays of the convex lens. If the angle between the reflectors is varied, the two reflected images are caused to move, one relative to the other, and it is possible by this means to bring two diametrically opposed points of the pupil into coincidence. The angularity of the reflectors corresponding to this relation of coincidence is dependent upon the size of the pupil, so that, the magnitude of this angle is a measure of the pupil diameter and therefore of the light intensity entering the eye.

As is well known, the distance of distinct vision varies with different individuals and it is desirable in a device of this kind, to bring the object of observation (that is the pupil) into sharp focus. This is accomplished by moving the pupil toward or away from the convex lens until the images appear most distinct. However, such an adjustment alters the position as well as the size of the virtual image formed by the convex lens, and this in turn requires a different angle between the reflectors for the condition of coincidence above described. In the present invention automatic compensating means are provided, whereby the coincidence of the images is unaffected by the adjustments of focusing, that is, the indicated measure of the pupil diameter will be the same for near, normal or far vision.

The contraction or dilation of the iris follows a well defined general law, but the size of the pupil corresponding to any given light intensity varies with different individuals. It is therefore, necessary to adjust the present device to the eye of the individual user, in order to obtain correct reading, but after the device is once adjusted for a given light intensity, it will give correct reading for all other light intensities. Means for conveniently making such an adjustment are provided and will be explained in connection with the drawings.

If one eye is more strongly illuminated than the other, equality of pupillary areas results, due to the consensual action of the eyes. Thus, if the instrument, herein disclosed, is placed in front of the pupil of the right eye, the left eye may be directed toward the object the brightness of which is to be measured, and the size of the pupil of the right eye will be influenced by the light proceeding from the object, even though the right eye is obscured by the instrument.

Fig. 8 shows a top view of the inside mechanism, at an enlarged scale, with the casing cut away.

Fig. 9 represents a partial section on line "9, 9" Fig. 12 showing the structure of the finger pieces, which is part of the focusing mechanism.

Fig. 10 is an isometric projection of the right hand reflector holder.

Fig. 11 is a side view of Fig. 8 with the casing cut away.

Fig. 12 is a section on line "12, 12" of Fig. 8.

Fig. 13 is a section on line "13, 13" Fig. 8.

Fig. 14 is a partial section on line "14, 14" Fig. 8.

Figure 1:
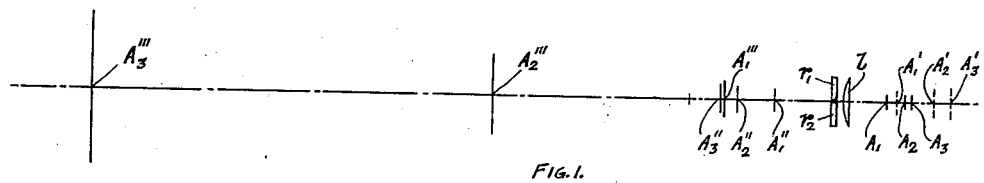
Fig. 1 represents in a schematic diagram, the geometric relations of the various elements of the optic system.

In Fig. 1, $l$ represents the convex lens in front of the pupil and $r_1$ and $r_2$ represent the two adjacent reflectors. In this diagram the angle between the reflectors is zero, so that they will reflect only a single image. The position and the size of the pupil for normal vision is shown at $A_2$ and a virtual enlarged image of this is formed by the lens $l$ at $A_2'$; this image $A_2'$ is reproduced by reflectors $r_1$ and $r_2$ at the position $A_2''$ on the optic axis. The rays forming the virtual image of $A_2''$ are, however, reflected back to the lens $l$, so that the lens will form a final virtual image of the pupil at $A_2'''$, which is the one observed by the eye. The positions of the pupil for near and far vision are at $A_1$ and $A_3$, and the corresponding virtual images are at $A_1'$ and $A_3'$, which are reproduced by reflection at $A_1''$ and $A_3''$. The corresponding final images formed by the lens and observed by the eye, are shown at $A_1'''$ and $A_3'''$ respectively.

Figure 2:
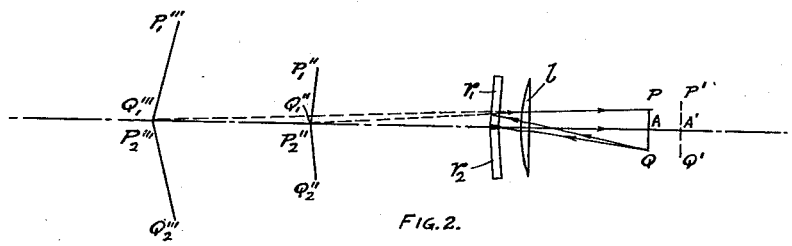
Fig. 2 shows the rays by which an image of a point of the iris is formed.
Figures 6, 7:
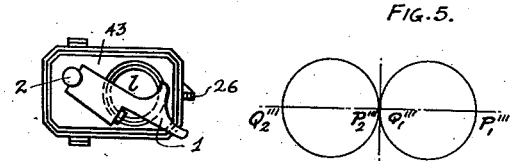
Fig. 6 shows the front view of the device when not in use.
Fig. 7 is a diagrammatic view of the pupil images in alignment.

In Fig. 2 the reflectors $r_1$ and $r_2$ are shown at an angle, and the virtual image $P'Q'$ is reproduced by reflector $r_1$ at $P_1''Q_1''$ and by reflector $r_2$ at $P_2''Q_2''$, the points $Q_1''$ and $P_2''$ corresponding to points P and Q of the pupil being in coincidence, and hence points $Q_1'''P_2'''$ of the final images, which are observed by the eye, are likewise in coincidence, appearing as shown in Fig. 7. The rays proceeding from the point Q of the pupil, pass through the lens $l$ to the reflector $r_1$ and are reflected back through the lens into the eye. All of the rays proceeding from Q and reflected from the reflector $r_1$ appear to issue from the final image point $Q_1'''$, and all such rays are included in the angle $P Q_1''' A$. A similar set of rays correspond to the point P and reflector $r_2$, and to all other points of the pupil.

Figure 3:
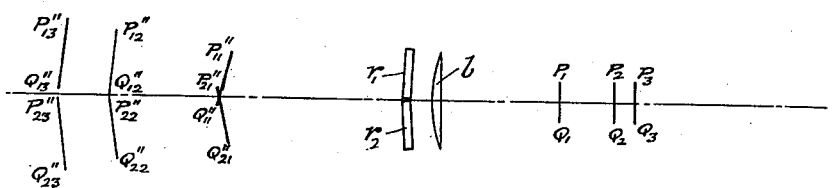
Fig. 3 shows the relations of the images of the pupil corresponding to near, normal and far vision.
Figure 4:
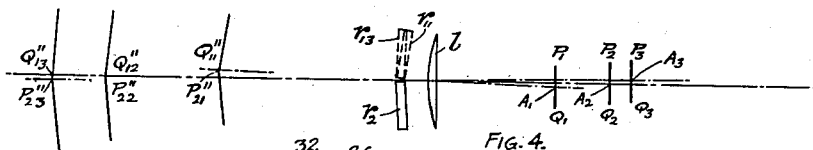
Fig. 4 represents the relations of the images of Fig. 3 after compensation.

In Fig. 3, $P_2 Q_2$ represents the position of the pupil corresponding to normal vision, and the angle between the reflectors $r_1$ and $r_2$ is such, that the corresponding image points $Q_{12}''$ and $P_{22}''$ are in coincidence upon the axis. If now, in the process of focusing for near vision, the pupil were moved to the position $P_1 Q_1$, nearer to the lens $l$ (while the angularity of the reflectors remained constant) the corresponding virtual image points $Q_{11}''$, reproduced by reflector $r_1$, and $P_{21}''$, reproduced by reflector $r_2$, would no longer coincide upon the axis, but would be displaced in an overlapping relation as shown. Similarly, if the pupil is moved away from the lens $l$ to position $P_3 Q_3$, in focusing for far vision, the corresponding virtual image points $Q_{13}''$ and $P_{23}''$ will be separated as shown. To bring these image points into coincidence for near and far vision requires a change in the angularity of the reflectors; however, such a change must not affect the scale which indicates the measure of the pupil diameter. In the present invention this is accomplished by imparting to the reflector $r_1$ a compensating movement during the process of focusing, which automatically changes the angularity of the reflectors to cause the virtual image points to remain in their relation of coincidence for all the intermediate positions of the pupil between near vision and far vision. The movement of the reflector $r_2$ is however, controlled by the scale which indicates the magnitude of the pupil diameter, while the compensating movement of $r_1$ has no influence upon the indications of this scale. The effect of this compensating movement is shown in Fig. 4. The image points $Q_{12}''P_{22}''$ corresponding to the position of normal vision of the pupil at $P_2 Q_2$ are shown in coincidence upon the axis, the same as in Fig. 3. The angular position of $r_2$ (relative to the optic axis) is dependent upon the pupil diameter. If the pupil is moved nearer to the lens $l$ to $P_1 Q_1$, and simultaneously the reflector $r_1$ receives a compensating movement shown at $r_{11}$, then the image point $Q_{11}''$ will move in coincidence with the point $P_{21}''$, the position of which relative to optic axis remains unchanged; thus for near vision the point of coincidence is off the axis, and this requires a corresponding displacement of the center of the pupil as shown at $A_1$. For far vision the compensated position of reflector $r_1$ is at $r_{13}$ and the coincidence of the image points is at $Q_{13}''P_{23}''$, off the axis, but in the opposite direction to that for near vision. $A_3$ shows the position of the center of the pupil for far vision.

Figure 5:
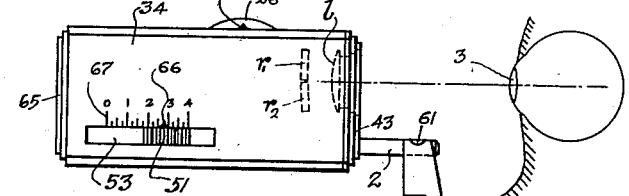
Fig. 5 shows the manner of using the instrument.

Fig. 5 shows how the instrument is held relative to the eye. The nose-piece 1 supported on a rod 2 which slides parallel to the axis of the lens $l$ for varying the distance between the lens and the pupil of the eye 3.

The mechanism of the device is built on a frame member 4, Figs. 8, 11, 12, 13 and 14. The reflectors $r_1$ and $r_2$, Figs. 8, 11 and 12 are mounted upon holders formed out of sheet metal, and are pivotally supported upon the frame member 4. An upwardly projecting portion 5, of the holder for reflector $r_1$, is provided with two bent hooks 6, at its upper end, and with a similar hook 7 on its lower end, which is midway between the two upper hooks, as shown in Figs. 10, 11 and 12. These hooks 6 and 7 provide a three point support for the reflector $r_1$ which is held in place against said hooks by a retaining spring 8, Fig. 11. Below the left hand edge of the reflector is a horizontal projection provided with a hole 9, Fig. 10, by which said holder is pivotally supported upon the pivot stud 10 on the frame member 4, Fig. 11. On the right side of the reflector holder an upwardly projecting part 11 (Figs. 8, 10, 11 and 12) is bent at right angles toward the left, as shown at 12, and is provided with a hole 13, vertically above the lower hole 9, Fig. 10. The frame member 4 is bent upward at 14, on the left hand side, and a short portion 15 bent toward the right, Figs. 8, 11 and 12. Portion 15 is provided with a pivot stud 16 which is vertically above the lower pivot stud 10. The hole 13 in the reflector holder fits the pivot stud 16, so that the reflector holder is mounted for pivotal movement upon the two pivot studs 10 and 16. On the upper portion 12 of the reflector holder is a U shaped formation 17, provided with an adjusting screw 18, (Figs. 8, 10 and 11) the end of which bears against the free upper end of the part 5 which supports the reflector, so that by means of this screw the upper end of the reflector may be precisely adjusted, for obtaining the proper positioning of the virtual images formed by the reflectors. The lower part of the reflector holder extends rearwardly and is provided with an upwardly bent spring hook 19, Figs. 8, 10 and 11, and ending with a horizontal U formation 20, adapted to receive an adjusting screw 21, Figs. 8, 11 and 14. The space between the parallel surfaces of the U formation is somewhat less than the diameter of the screw, so that the screw threads are partially imbedded between the parallel surfaces. This type of adjusting screw takes up but little space in height and remains tight without a locknut. The reflector holder for the reflector $r_2$ is in all respects similar to the reflector holder for the reflector $r_1$ with the exception of the lower rearward projection. Both reflector holders are supported by the same pivot studs 10 and 16, as shown in Figs. 11 and 12. The lower rearward projection of the reflector holder for reflector $r_2$ is provided with a horizontal U formation, similar to formation 20, for receiving an adjusting screw 22, Figs. 8 and 13. The adjusting screw 22 bears against a cam element 23, which fits slidingly into the opening of the U formation as shown in Fig. 13, and thereby insures the alignment of the adjusting screw in contact with the cam. To the rear of the screw 22 the reflector holder ends in a spring hook 24, Fig. 8, which is opposite the spring hook 19. A spring 25, Figs. 8 and 11 and 13, on the two spring hooks, tends to rock the two reflector holders about their pivots, and to hold the set screw 22 continuously in contact with the cam. The cam is secured to a tubular extension of a revolving dial wheel 26, Fig. 13, which is pivotally supported on a fixed stud 27, and frictionally held by a resilient disc 28, Figs. 8 and 13, the circumferential part of which presses on the bottom surface of a circular depression 29 of the dial wheel, while the central part of the resilient disc engages opposed slots 30, near the top of the stud 27. The inclined surface 31 of the dial wheel is provided with a scale, and symbols or numbers which are read opposite a pointer 32, Fig. 5. In place of numerical values for the pupil diameters, the scale is preferably graduated to indicate exposure periods in fractions of a second; or arbitrary symbols on the dial may be referred to a table of exposures, in which each symbol or division of the scale is corelated to a set of values corresponding to the varying factors (other than the light intensity), which effect the time of exposure in photography. The cam 23 imparts a rocking motion to reflector $r_2$, the angular positions of which are definitely related to the pupil diameters, as explained in connection with Figs. 2, 3 and 4.

It was explained in connection with Fig. 3 that the overlapping or separation of the images results from moving the pupil nearer or further from the lens $l$ during the process of focusing. It can be shown, however, that the overlapping or separation of the images is further effected by another factor, namely, the diameter of the pupil itself. The larger the diameter of the pupil the greater will be the overlapping or separation of the images, other conditions remaining the same. Hence, in order to obtain true compensation, it is necessary to control the angular motion of the reflector $r_1$ not only by the distance of the pupil from the lens $l$ but by the diameter of the pupil also.

In Figs. 8, 11, 12 and 13, a channel shaped member 33 fits slidingly inside the casing 34, and is supported on its rearward end by an extension 35, which is formed out of the frame member 4, Figs. 8 and 11. This extension 35 is provided with a slot 36, and a stud 37 sliding in this slot is riveted to the channel member 33. By means of a friction washer 38, upon the stud 37, the member 33 is held in sliding frictional contact with extension 35. On the forward end, the channel member 33 is provided with lip 39, and another similar lip is sheared out of the body of the member 33 at 40, Figs. 8, 11, 12 and 13. These spaced lips are provided with holes for receiving the rod 2. Just inside the two lips the rod 2 is provided with two grooves 41, which are engaged by the formed edges of a resilient spring member 42, which prevents the longitudinal motion of the rod 2 relative to the member 33, but allows free rotation for same. The rod 2 is slidingly mounted in the front wall 43, which is rigidly fastened to the upward bent part 14 of the frame member 4. Thus by the rod 2, upon which the nose piece 1 is mounted, the focusing movement is transmitted to the member 33. The lower rearward end of the member 33 is provided with an offset projection 44, Figs. 8 and 14, upon which is pivotally mounted a member 45 by means of a stud 46. The member 45 is provided with a cam surface 47, which cooperates with the end of the adjusting screw 21, and thereby imparts a compensating rocking motion to the reflector $r_1$ during the process of focusing. The tip of the screw 21 is maintained in contact with the cam surface 47 by the spring 25. The member 45 has a forward extension 48 which bears against a cam 49, Figs. 8 and 13, which is rigidly mounted upon the tubular extension of the dial wheel 26 below the cam 23, and is held in contact with this cam by the torsion spring 50, Figs. 8 and 14. The dial wheel, through the cam 23, imparts a rocking motion to reflector $r_2$ which is definitely related to the pupil diameter, and the position of the cam member 45 is influenced, according to the magnitude of the pupil diameter, by the cam 49, so that motion transmitted to the reflector $r_1$ is similarly influenced, and thus a compensating movement obtained which is dependent upon the focusing movement as well as upon the size of the pupil.

In order to facilitate the focusing movement, the member 33 is provided with two opposite finger pieces 51 and 52, which project through slots 53 in the casing 34, Figs. 5, 9, 11, 12, 13 and 14. The device is held by these finger pieces with one hand, and the casing grasped and moved with the other hand, sliding it upon the rod 2. The member 33 is provided with two rectangular apertures opposite the slots 53, through which the finger pieces are assembled. In Fig. 9 the finger piece 51 is shown with two slots, a short slot 54 and a longer slot 55 opposite to the slot 54. The center of the longer slot is bored out to receive a compression spring 56, which exerts a pressure against one side of the aperture in member 33, and forces the bottom of slot 54 against the opposite side of the aperture. The spring 56 is stiff enough to hold the finger piece 51 firmly relative to member 33 during the process of focusing. To remove the finger piece, it is moved to compress the spring 56 until the heel 57 clears the edge of the aperture, when it can readily be tilted and removed; it is replaced in similar manner.

The nose piece 1, straddles the end of rod 2, Figs. 5, 8 and 11, and is held to the rod by a stud 58, the head of which fits slidingly in a hole in the nose piece. The stud is riveted to the rod 2 and a light compression spring 59 presses against the inside shoulder of the head of the stud and against a shoulder 60, near the bottom of the hole in the nose piece. Thus the nose piece can be made to slide on the stud against the tension of the spring 59 and thereby the optic axis shifted relative to the pupil, as explained in connection with pupil centers $A_1$ and $A_3$, Fig. 4. Semicircular notches 61 are provided to hold the nose piece flatwise against the front wall 43, when the device is not in use, as shown in Fig. 6.

The adjusting screws 21 and 22 upon the reflector holders are used in the calibration of the instrument, in adjusting the angular relation between the reflectors. It was explained that the pupil diameters corresponding to a given light intensity, vary with different individuals, and therefore it is necessary to make a corrective adjustment, adapting the instrument to the individual user. This can most conveniently be done by adjusting the screw 21, and in order to make this easily accessible, means are provided for quickly and easily removing the casing 34. The front wall 43 is rigidly fastened to the vertical part 14 of the frame member 4, and the edge of the casing fits against the inside edge of the wall 43 and closely about the periphery of the part 14 as shown in Figs. 8 and 11.

The rearward end of the frame member 4 is bent upward at 62 upon which is fastened a spring snap button 63 of conventional design, which cooperates with a snap stud 64 riveted into the rear wall 65, which is part of the casing. Before the casing is pulled off the snap button, the finger pieces 51 and 52 must be removed.

The finger pieces are preferably provided with a pointer 66 Fig. 5, which cooperates with a scale 67 alongside the slot 53. By setting the pointer opposite a predetermined division of the scale, according to the vision of the individual user, the necessity for repeated focusing may be avoided.

What I claim is:

1. In combination with an exposure meter, a lens and means for positioning said lens relative to the pupil; two reflectors, and pivotal mountings for said reflectors; mechanism for imparting motion to one of the reflectors by the positioning means of said lens; independent means for moving the other reflector, and means for indicating the magnitude of such motion.

2. In combination with an exposure meter, a lens, and means for positioning said lens relative to the pupil; two reflectors, adapted to reflect two distinct virtual images of the pupil; means for adjusting the angle between said reflectors for shifting the images of two diametrically opposed points of the pupil into coincidence, and means for indicating the magnitude of said angle.

3. In combination with an exposure meter, a lens and means for positioning said lens relative to the pupil; two reflectors, and pivotal mountings for said reflectors; means for imparting a rocking movement to one of said reflectors, the magnitude of said rocking movement depending upon the diameter of the pupil, and means for indicating the magnitude of such motion; mechanism for imparting a rocking motion to the other reflector, said motion being simultaneously dependent upon the positioning means for the lens and upon the diameter of the pupil.

4. In combination with an exposure meter, a lens, and means for positioning said lens relative to the pupil; two reflectors, and pivotal mountings for said reflectors; a cam cooperating with one of said reflectors, and indicator means in connection with said cam; mechanism connected with the positioning means of said lens for imparting a compensating movement to the other reflector.

5. In combination with an exposure meter, a lens, and means for positioning said lens relative to the pupil; two reflectors, and pivotal mountings for said reflectors; a dial wheel, a cam integral with said dial wheel and cooperating with one of said reflectors; another cam co-operating with the positioning means of said lens, and adapted to impart movement to the other reflector during the process of focusing.

6. In combination with an exposure meter, a lens, and means for positioning said lens relative to the pupil; two reflectors and pivotal mountings for said reflectors; a dial wheel; a cam cooperating with one of said reflectors and integral with said dial wheel; another cam pivotally supported upon the positioning means of the lens, and adapted to impart motion to the other reflector, and cooperative connection between said cam and the dial wheel.

7. In combination with an exposure meter, a lens, and means for positioning said lens relative to the pupil; two reflectors and pivotal mountings for said reflectors; a cam cooperating with one of said reflectors and a screw for adjusting the position of the reflector relative to said cam; another cam connected to the positioning means for the lens and cooperating with the other reflector, and a screw for adjusting the position of said reflector relative to the last recited cam.

8. In combination with an exposure meter, a nose piece for positioning the device relative to the pupil; a support for said nose piece; a stud upon said support, and means for mounting the nose piece for sliding motion upon said stud; a spring for forcing the nose piece toward its support, and cooperating means between the nose piece and its support for yieldingly supporting the nose piece in two different positions.

9. In combination with an exposure meter, two reflectors; holders for said reflectors adapted to be mounted on common pivots; a separate cam cooperating with each of said reflector holders, and a spring for holding said holders in contact with their cams.

10. In combination with an exposure meter, a lens, and means for positioning said lens relative to the pupil of the human eye; two reflectors cooperating with said lens, for viewing two separate images of the pupil; a pivotal mounting for one of the reflectors; a cam; and means for imparting a tilting movement to the pivoted reflector by the operation of said cam, for tilting said reflector relative to the other reflector, to bring the images of the pupil into a predetermined alignment, and a scale device cooperating with said cam, for indicating the magnitude of said tilting movement.

NICHOLAS MILLER.